United States Patent [19]

Shaw et al.

[11] Patent Number: 4,471,061

[45] Date of Patent: Sep. 11, 1984

[54] METHODS FOR TREATMENT OF PHOSPHOMOLYBDIC ACID BASED CATALYSTS DURING REACTOR SHUTDOWN

[75] Inventors: Wilfrid G. Shaw, Lyndhurst; Christos Paparizos, Willowick; Diane G. Farrington, Brecksville, all of Ohio

[73] Assignee: The Standard Oil Company, Cleveland, Ohio

[21] Appl. No.: 497,691

[22] Filed: May 24, 1983

Related U.S. Application Data

[63] Continuation of Ser. No. 290,527, Aug. 6, 1981, abandoned, which is a continuation-in-part of Ser. No. 108,867, Dec. 31, 1979, abandoned.

[51] Int. Cl.³ .............. B01J 27/28; C07C 51/25; C07C 51/377; C07C 57/055
[52] U.S. Cl. .................. 502/34; 260/465.3; 560/214; 562/531; 562/532; 562/534; 562/535; 562/599
[58] Field of Search ............ 252/411 R, 416, 435, 252/437; 562/531, 532, 534, 535; 260/413–14; 502/34, 211

[56] References Cited

U.S. PATENT DOCUMENTS

| | | | |
|---|---|---|---|
| 1,678,627 | 7/1928 | Jaegr | 252/415 |
| 2,963,443 | 12/1960 | Nixon | 252/416 |
| 3,326,817 | 6/1967 | Callahan et al. | 252/437 |
| 4,020,174 | 4/1977 | Partenheimer | 260/346.8 A |
| 4,083,805 | 4/1978 | White et al. | 562/535 |
| 4,138,366 | 2/1979 | Shaw et al. | 252/435 |
| 4,182,907 | 6/1980 | Grasselli et al. | 252/437 |
| 4,307,247 | 12/1981 | Shaw et al. | 252/435 |
| 4,321,160 | 3/1982 | Farrington et al. | 252/437 |

FOREIGN PATENT DOCUMENTS 1464198 2/1977 United Kingdom.

*Primary Examiner*—P. E. Konopka
*Attorney, Agent, or Firm*—Joseph G. Curatolo; Larry W. Evans

[57] ABSTRACT

The present invention relates to a method for maintaining the activity of PMA based catalysts during reactor shutdown by flushing the reactor with an oxide of nitrogen gas at a temperature of from about 150° C. to about 370° C. The method can be employed in the reactor by terminating the feed of hydrocarbon to the reactor and then flushing the reactor. The method can be employed to treat PMA based catalysts having the general formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, arsenic, bismuth and tellurium; D is palladium; E is aluminum, barium, calcium, cerium, chromium, cobalt, iron, magnesium, manganese, nickel tantalum, titanium, tungsten, zinc, zirconium, chlorine and/or bromine; x can be 3 to 15, y can be 1 to 1.5; a can be 0.1 to 3; b can be 0.1 to 3; c can be 0 to 2; d can be 0 to 2; e can be 0 to 4 and z is a number necessary to satisfy the valence of all the other elements.

24 Claims, No Drawings

METHODS FOR TREATMENT OF PHOSPHOMOLYBDIC ACID BASED CATALYSTS DURING REACTOR SHUTDOWN

CROSS REFERENCE TO RELATED APPLICATIONS

This application is a continuation of application Ser. No. 290,527, filed Aug. 6, 1981, now abandoned, which in turn is a continuation-in-part of U.S. Ser. No. 108,867, filed Dec. 31, 1979, now abandoned.

TECHNICAL FIELD

Catalysts comprising phosphomolybdic acid and various salts thereof have recognized utility in several areas of petrochemical processing. An area of particular importance and which exemplifies the present invention is the use of phosphomolybdic acid based compounds as catalysts for the preparation of various acids such as methacrylic acid from saturated and unsaturated aldehydes such as isobutyraldehyde and methacrolein, respectively. Catalysis with supported or unsupported dehydrated phosphomolybdic acid in combination with small amounts of promoters such as antimony, arsenic, bismuth, copper, tellurium and hydroxides or decomposable salts of alkalis and alkaline earth metals and others is a process of specific economic interest.

It has become well known that phosphomolybdic acid (PMA) and salts thereof are sensitive to significant structural change caused by thermal, hydrolytic or reductive stress. As is to be expected, such physical and chemical changes caused by these stresses are directly refected in a reduction in catalytic activity. Thus, it has not been uncommon for much of the catalytic activity to be lost after only a relatively short on-stream time.

Deactivation of PMA based catalysts can occur by processes which cause loss of acid sites via condensation crosslinking. Contacting an active deammoniated PMA based catalyst with moisture below about 100° C. is a certain means of causing deactivation. In this temperature range water vapor undergoes capillary and surface condensation within the catalyst particles. Generally, shutdown of the reactor for significant periods of time is marked by a significant decrease in catalytic activity.

Scheduled and unscheduled reactor shutdowns during catalytic operations inevitably occur. Experience in both laboratory and pilot plants has shown that the usual procedure of flushing the reactor with air, nitrogen and/or steam or, the static system for shutting down and holding PMA based catalysts at bath temperatures can cause a substantial decline in catalytic performance when the oxidation reaction is again resumed.

BACKGROUND ART

While much has been published or patented on the subject of PMA based catalysts and their uses as oxidation catalysts, to our knowledge there have been no fixed-bed plants in operation for methacrolein oxidation and no patents exist that set forth any procedure for maintaining the activity of a PMA based oxidation catalyst during shut-downs. Standard fixed-bed shutdown and holding procedures have been shown to be detrimental to catalyst performance. If the bath were to be cooled during a shutdown, to about 250° C., catalyst maintenance might be possible, however, it would be both awkward and impractical to cool and/or drain the salt during each shutdown and, such a practice would likely require hours to accomplish.

Thus, the prior art of which we are aware has not set forth a method by which the activity of a PMA based catalyst can be maintained during reactor shutdown. To be useful, we believe the maintenance of PMA based catalysts during shutdown must be relatively inexpensive, simple and quick to accomplish without necessitating cooling or draining of the salt from the reactor bath.

DISCLOSURE OF THE INVENTION

It is therefore an object of the present invention to provide a method for maintaining the activity of PMA based catalysts, utilized in the preparation of acids from saturated and unsaturated aldehydes, during reactor shutdown.

It is another object of the present invention to provide a method for maintaining the activity of PMA based catalysts which can be used for the conversion of compounds such as unsaturated aldehydes, acids, esters and substituted and unsubstituted aromatic compounds and saturated aldehydes, alcohols, esters and nitriles.

It is another object of the present invention to provide a method for readily and inexpensively maintaining the activity of PMA based catalysts during reactor shutdown without necessitating cooling or draining of the salt from the reactor bath.

It is yet another object of the present invention to provide a method for improving the activity of PMA based catalysts during reactor shutdown.

These and other objects, together with the advantages thereof over known methods, which shall become apparent from the specification which follows, are accomplished by the invention as hereinafter described and claimed.

In general the method of the present invention involves the steps of terminating the hydrocarbon feed and flushing the reactor with an oxide of nitrogen at a temperature of from about 150° C. to about 370° C. The catalysts treated are those having a ratio of molybdenum to phosphorus of 3:1 to 15:1. As will be discussed in greater detail hereinbelow, the oxide of nitrogen preferably employed is nitric oxide which is passed over the catalyst for a period of at least one minute.

PREFERRED MODE FOR CARRYING OUT THE INVENTION

The catalyst commonly employed in the preparation of methancrylic acid from methacrolein or isobutyraldehyde is a PMA based catalyst which can be provided with one or more promoters and which has the general formula $Mo_xP_yA_aB_bC_cD_dE_eO_z$. Suitable promoters include the following: where A is ammonium, cesium, potassium, rubidium and/or thallium; B is copper and/or vanadium; C is antimony, arsenic, bismuth and/or tellurium; D is palladium; E is aluminum, barium, calcium, cerium, chromium, cobalt, iron, magnesium, manganese, nickel, tantalum, titanium, tungsten, zinc, zirconium, chlorine and/or bromine; and, wherein x can be 3 to 15 and is preferably 12, y can be 1 to 1.5, a can be 0.1 to 3 and is preferably 1 to 2, b can be 0.1 to 3 and is preferably 0.1 to 1, c can be 0 to 2 and is preferably 0 to 0.7, d can be 0 to 2 and is preferably 0 to 1, e can be 0 to 4 and is preferably 0 to 1, and z is a number necessary to satisfy the valence of all the other elements. Suitable catalysts and the preparation thereof have been described in several U.S. Patents commonly owned by the Assignee of record herein and include, for instance, U.S. Pat. Nos. 4,083,805 and 4,138,366. Of these many catalysts, those having a ratio of molybdenum to phosphorous of from about 3:1 to as high as 15:1 can be employed with 9 to 12:1 being preferred. Four catalysts which were treated according to the method of the present invention have the formulae $Mo_{12}PRbBi_{0.25}As_{0.25}Cu_{0.25}V_{0.5}O_z$, $Mo_{12}PRbAs_{0.1}V_{0.25}Cu_{0.25}O_z$, $Mo_{12}PRbBi_{0.25}V_{0.5}Cu_{0.25}O_z$, and $Mo_{12}P_{1.5}RbV_{0.25}Cu_{0.25}O_z$.

The conversion of aldehyde to acid is accomplished with molecular oxygen, conducted directly to the reaction vessel, or supplied as air. Hence, the conversion is an oxidative type or is at least conducted in an oxidative atmosphere. Preparation of methacrylic acid from methacrolein is via selective oxidation of the aldehyde whereas preparation from isobutyraldehyde involves oxydehydrogenation of the aldehyde. For ease of discussion herein, the preparation of methacrylic acid shall be stated to result from the conversion of saturated or unsaturated aldehydes.

In addition to conversion of saturated and unsaturated aldehydes, PMA based catalysts of the type disclosed herein have been employed in the conversion of other organic compounds both unsaturated and saturated. Typical unsaturated compounds include alcohols and esters which are converted to unsaturated acids; aromatics such as benzaldehyde, to benzoic acid or to esters in the presence of alcohols and, substituted aromatics such as ethylbenzene to styrene. Exemplary saturated types include alcohols which can be converted to unsaturated acids and alkenes under high temperature conditions or to alkenes with and without rearrangement of the chain when conducted at lower temperatures; aldehydes to lower aldehydes at low temperature conversions; nitriles to form modified branched nitriles such as the conversion of isobutyronitrile to methacrylonitrile and, esters which become modified as in the case of methylisobutyrate to methacrylic acid and methyl methacrylate or, isopropyl acetate to acetic acid and propylene.

Thus, the conversion effected by these catalysts can include oxidation, dehydration and oxydehydrogenation. Inasmuch as the subject invention is directed toward maintaining the activity of PMA based catalysts during periods of reactor shutdown, it is to be understood that operability of the method claimed is not dependent upon the specific conversion reaction in which the catalyst is employed. While it is therefore not necessary to provide examples of each different conversion effected in the presence of the PMA based catalysts disclosed herein, the conversion of unsaturated and saturated aldehydes shall be discussed in order to demonstrate the usefulness of the present invention in maintaining the acitivy of the catalyst.

As stated hereinabove, the conversion of aldehydes to acid over the catlyst is conducted in the presence of oxygen and the oxygen and aldehyde reactants e.g., isobutyraldehyde or methancrolein, are preferably carried by steam, with the foregoing reactants collectively being referred to as the reactant feed. The steam can optionally be replaced by recycled gases from the reactor which would normally include nitrogen, oxygen, carbon oxides and other gases which would also comprise a portion of the reactant feed. In some oxidation systems, the reactant feed could also include the effluent from a first stage reactor wherein isobutylene is principally converted to methacrolein. When the effluent comprises the reactant feed, it will be understood that other components will also be present; several that are by-products of the first stage of isobutylene to methacrolein conversion and others such as air which would normally be added for the conversion of isobutyraldehyde or methacrolein.

The conversion reaction can be conducted in either a fixed-bed or fluid-bed reactor at temperatures of from about 200° C. to about 400° C. and pressures of about 0.2 to about 10 atmospheres. The catalyst may be in a supported or unsupported form; suitable support materials including silica, alumina, boron-phosphate, titania, zirconia and the like and preferably Alundum as well as mixtures thereof. The catalyst can have any of the conventional fixed-bed forms such as coated, tablet, pellet, extruded, spherical, or fluid-bed forms such as microspherical or other forms known in the art. Presence of the catalyst increases the rate and percent of conversion, the selectivity of the reaction, e.g., wherein the aldehyde to acid conversion is favored, and the single pass yield.

As stated hereinabove, the oxides of nitrogen are utilized to flush the reactor prior to shutdown. The gaseous oxides of nitrogen having utility in the present invention include all oxides of nitrogen and mixtures thereof with nitric oxide being preferred. Nitric or nitrous acid or a decomposition component thereof could also be employed separately or with an oxide of nitrogen. The feed of nitric oxide is generally conducted over the catalyst for a period of time of from about one minute to about several hours when a low rate of feed is employed. The amount of the nitric oxide introduced into the reactor can vary as desired but generally an amount in volume equal to about 0.5 to about 50 times the volume of the catalyst would be satisfactory. The step of flushing can be conducted at a temperature ranging from about 150° C. to about 370° C. with about 225° C. to about 350° C. being preferred. Treatment can be conducted at near atmospheric or superatmospheric pressures.

In Examples 1-4 which follow, a PMA promoted catalyst having the formula $Mo_{12}PRbBi_{0.25}As_{0.25}Cu_{0.25}V_{0.5}O_z$ was essentially deactivated by flushing the reactor with steam, nitrogen, air and ammonia gas in four separate instances prior to shutdown in order to demonstrate the before and after activity of the catalyst following typical shutdown procedures. The 30 weight percent of active catalyst component was supported on a 0.3 cm spherical Alundum carrier.

composition was the same. The differences were due to the fact that the catalysts received different activations and were each on-stream for various periods of time.

TABLE I

Deactivation of PMA Based Catalyst Utilizing Standard Shutdown Procedures

| Ex. No. | % Conversion of MA[a] | % Sel to MAA[a] | Flush Gas | Static Period and Temp. Following Flushing | % Conversion of MA[b] | % Sel to MAA[b] |
|---|---|---|---|---|---|---|
| 1 | 82.6 | 83.6 | Steam | 76 hrs. at 325° C. | 34.3 | 98.3 |
| 2 | 78.2 | 82.9 | Nitrogen | 74 hrs. at 325° C. | 42.2 | 91.4 |
| 3 | 68.2 | 87.0 | Air | 80 hrs. at 325° C. | 38.8 | 79.7 |
| 4 | 70.4 | 70.1 | Ammonia | 6 hrs. at 325° C. | 37.6 | 69.5 |

[a]determined prior to shutdown
[b]determined subsequent to shutdown

The procedure and apparatus employed involved a 20 cc microreactor utilized in tandem with a larger isobutylene oxidation reactor fed with isobutylene, steam and air. A slip stream of the reactor effluent from the latter, containing 72% methacrolein and 11% methacrylic acid, was fed to the microreactor at 325° C. for a contact time of approximately 2.9 seconds for conversion to methacrylic acid. Alternately, methacrolein was fed to the 20 cc microreactor at 315° C. to 325° C. at a contact time of approximately 3.1 seconds for conversion to methacrylic acid. This latter procedure was employed for Examples 5–9.

In order to evaluate the effectiveness of the method set forth herein, certain yields were calculated by measuring the percent total conversion, percent per single pass yield or percent yield (% Yield), and percent selectivity (% Sel), which are defined as follows:

$$\text{Percent Conversions} = \frac{\text{Moles of aldehyde reacted}}{\text{Moles of aldehyde fed}} \times 100$$

$$\text{Percent Single Pass Yield} = \frac{\text{Moles of product recovered}}{\text{Moles of aldehyde fed}} \times 100$$

$$\text{Percent Selectivity} = \frac{\text{Moles of product recovered}}{\text{Moles of aldehyde reacted}} \times 100$$

The examples reported in Table I indicate yields in terms of % Conversion of methacrolein (MA) and % Sel to methacrylic acid (MAA) after several hours of running with a freshly activated catalyst. The reactor was then swept with one of the gases, maintained static for many hours after which hydrocarbon feed was resumed and yields were again determined. After the catalyst was deactivated, % Selectivity was not significantly affected, however, % Conversion was greatly reduced. It will be noted that the initial conversions of methacrolein prior to shutdown were each different for Examples 1–4, notwithstanding the fact that the catalyst In each of the four examples % Conversion of methacrolein was generally high and satisfactory. However, by flushing the reactor with any of the gases prior to shutdown, it is seen that the % Conversion is decreased anywhere from 43 to 58% upon resumption of the oxidation. Such decreases indicate a severely deactivated catalyst which will require reactivation before being used further.

The alternate procedure set forth hereinabove was employed in the next two examples reported in Table II for the composition of $Mo_{12}PRbBi_{0.25}V_{0.5}Cu_{0.25}O_z$ except that in Example 5 no flushing step was made, while in Example 6 flushing with nitric oxide for 10 minutes was conducted prior to shutdown.

TABLE II

Treatment of PMA Based Catalyst with Nitric Oxide Prior to Shutdown

| Ex. No. | % Conv. of MA[a] | % Sel to MAA[a] | % Yield of MAA[a] | Flush Gas | Static Period and Temp. Following Flushing | % Conv. of MA[a] | % Sel to MAA[b] | % Yield of MAA[b] |
|---|---|---|---|---|---|---|---|---|
| 5 | 80.9 | 79.3 | 64.2 | None | 90 hrs. at 315° C. | 73.0 | 77.8 | 56.8 |
| 6 | 80.9 | 79.5 | 64.3 | NO | 89 hrs. at 315° C. | 92.5 | 79.3 | 73.4 |

[a]determined prior to shutdown
[b]determined subsequent to shutdown

Example 5 shows that with no flush gas, maintaining the reactor static, at a temperature of 315° C. for 90 hours, the catalyst was partially deactivated, % Yield to methacrylic acid decreasing by 11.5%. However, when nitric oxide was employed in the flushing step, the catalyst activity was not only maintained during shutdown but was actually improved, as indicated by the % Yield to methacrylic acid values for Example 6 when oxidation was resumed after shutdown.

In Table III, the method of the present invention was conducted with the catalysts $Mo_{12}PRbAs_{0.1}V_{0.25}Cu_{0.25}O_z$ and $Mo_{12}P_{1.5}RbV_{0.25}Cu_{0.25}O_z$ in Examples 7 and 8 respectively, utilizing nitric oxide. Unlike Examples 1–7, the catalyst in Example 8 was tabletted, representing 100% active ingredient (unsupported), rather than coated on a support. The tablet was cylindrical, approximately 4.5 mm in diameter by 3.5 mm high. Flushing with nitric oxide for Examples 7 and 8 was for 15 and 5 minutes, respectively. By comparing the before and after shutdown yields it is again evident that the nitric oxide flushing step improved catalyst activity for Example 7 and maintained it for Example 8.

TABLE III
Treatment of PMA Based Catalysts with Nitric Oxide Prior to Shutdown

| Ex. No. | % Yield of MAA[a] | % Sel to MAA[a] | % Total Conversion | Static Period and Temp. Following Flushing | % Yield of MAA[b] | % Sel to MAA[b] | % Total Conversion |
|---|---|---|---|---|---|---|---|
| 7 | 76.6 | 81.8 | 93.6 | 90 hrs. at 325° C. | 79.3 | 81.9 | 96.8 |
| 8 | 71.8 | 76.3 | 94.1 | 138 Hrs. at 315° C. | 71.1 | 73.1 | 97.2 |

[a]determined prior to shutdown
[b]determined subsequent to shutdown

By reviewing the data presented in Tables I–III, it can be seen that in every instance where the method of the present invention was employed, the activity of the catalyst could be maintained during reactor shutdown. As stated hereinabove, the catalysts of the present invention are not limited in their use solely to the conversion of unsaturated aldehydes. To demonstrate that the method herein can be employed to maintain the activity of a PMA based catalysts used for the conversion of saturated aldehydes, such as isobutyraldehyde to methacrylic acid, one of the foregoing catalysts, $Mo_{12}PRbBi_{0.25}Cu_{0.25}V_{0.5}O_z$, freshly prepared and calcined and supported on a 0.3 cm Alundum carrier, was selected.

The catalyst was placed in a reactor and a feed of isobutyraldehyde was passed thereover. Conditions for this work were as discussed hereinabove for the conversion of methacrolein to methacrylic acid. Example 9 serves as a control where isobutyraldehyde was reacted over the fresh catalyst. After a continuous run of 20 hours, the reactor was shut down while the catalyst was subjected to treatment with NO for about 10 minutes. Examples 10 and 11 report the use of the catalyst back on-stream with isobutyraldehyde after two and six hours, respectively. The foregoing examples are presented in Table IV.

TABLE IV
Treatment of PMA Based Catalyst Utilized for Conversion of Isobutyraldehyde

| Ex. No. | Treatment | Static Period and Temp. Following Flushing | % Yield of MAA | % Sel to MAA | % Total Conversion | Run (Hrs) |
|---|---|---|---|---|---|---|
| 9 | — | — | 60.4 | 60.4 | 100 | 20 |
| 10 | NO | 90 hrs. at 300° C. | 63.1 | 63.1 | 100 | 2 |
| 11 | NO | — | 61.5 | 61.5 | 100 | 6 |

As can be seen in Table IV, the activity of the catalyst during the period of shutdown was not only maintained but was actually somewhat improved. Based upon the results presented herein, it should be clear that the activity of PMA based catalysts, of the type disclosed herein, can be maintained during reactor shutdown irrespective of the type of reaction the catalyst is selected to promote.

In conclusion, considering the increases in percent yield of methacrylic acid from methacrolein and isobutyraldehyde that have been obtained when a PMA based catalyst has been treated according to the method set forth herein, it should be apparent that the objects of the invention have been met. It is to be understood that the treatment disclosed herein is applicable in general to PMA based catalysts which, as stated hereinabove, can be employed for the preparation of methacrylic acid from saturated and unsaturated aldehydes. It is to be further understood that the catalysts can include one or more promoters and that the presence or absence of these additional elements or compounds will not affect the method set forth herein. Furthermore, while these promoters may be employed to improve some aspect of the activity of the catalyst, the specific catalyst composition is not deemed to be a portion of the invention claimed herein. Nor, is the type of conversion effected with the catalyst significant to the operation of the present invention.

Thus, it should also be apparent to those skilled in the art that the subject invention is operable on PMA based catalysts having certain ratios of molybdenum to phosphorus and it is operable when other oxides of nitrogen, temperatures and pressures are employed. It is to be understood that while these variables fall within the scope of the claimed invention, the subject invention is not to be limited by the examples set forth herein. These have been provided merely to provide a demonstration of operability and therefore the selection of other oxides of nitrogen and the amounts thereof can be determined without departing from the spirit of the invention herein disclosed and described. Moreover, the scope of the invention shall include all modifications and variations that fall within the scope of the attached claims.

We claim:

1. A method for treating active phosphomolybdic acid based catalysts, employed for the preparation of acids and aldehydes, during periods of reactor shutdown to prevent deactivation occasioned thereby comprising the steps of:
   terminating the feed to the reactor containing the catalyst before deactivation thereof; and,
   flushing the reactor with an oxide of nitrogen at a temperature of from about 150° C. to about 370° C.; said phosphomolybdic acid based catalyst having the formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, arsenic, bismuth and tellurium; D is palladium; E is aluminum, barium, calcium, cerium, chromium, cobalt, iron, magnesium, manganese, nickel, tantalum, titanium, tungsten, zinc, zirconium, chlorine and/or bromine; x can be 3 to 15; y can be 1 to 1.5; a can be 0.1 to 3; b can be 0.1 to 3; c can be 0 to 2; d can be 0 to 2; e can be 0 to 4 and z is a number necessary to satisfy the valence of all other elements.

2. A method, as set forth in claim 1, wherein the step of flushing is conducted at a temperature of from about 225° C. to about 350° C.

3. A method, as set forth in claim 1, wherein the amount of said oxide of nitrogen introduced into the reactor for the step of flushing equals from about 0.5 to about 50 times the volume of said catalyst.

4. A method, as set forth in claim 1, wherein the step of flushing is conducted for a period of from about one minute to about several hours.

5. A method, as set forth in claim 1, wherein said oxide of nitrogen is selected from the group consisting of all oxides of nitrogen gas and mixtures thereof.

6. A method, as set forth in claim 5, wherein said oxide of nitrogen is nitric oxide.

7. A method, as set forth in claim 1, wherein x is 12; y is 1; a is 1 to 2; b is 0.1 to 1; c is 0 to 0.7; d is 0 to 1 and e is 0 to 1.

8. A method, as set forth in claim 1, wherein the composition of said phosphomolybdic acid based catalyst contains arsenic.

9. A method, as set forth in claim 1, wherein the composition of said phosphomolybdic acid based catalyst contains vanadium.

10. A method, as set forth in claim 1, wherein the coomposition of said phosphomolybdic acid based catalyst contains copper.

11. A method, as set forth in claim 1, wherein the composition of said phosphomolybdic acid based catalyst contains bismuth.

12. A method, as set forth in claim 1, wherein the composition of said phosphomolybdic acid based catalyst contains an alkali metal.

13. A method for treating active phosphomolybdic acid based catalysts, employed for the oxidation, dehydration or oxydehydrogenation of saturated and unsaturated organic compounds, during periods of reactor shutdown to prevent deactivation occasioned thereby comprising the steps of:
   terminating the feed to the reactor containing the catalyst before deactivation thereof; and,
   flushing the reactor with an oxide of nitrogen at a temperature of from about 150° C. to about 370° C.; said phosphomolybdic acid based catalyst having the formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, arsenic, bismuth and tellurium; D is palladium; E is aluminum, barium, calcium, cerium, chromium, cobalt, iron, magnesium, manganese, nickel, tantalum, titanium, tungsten, zinc, zirconium, chlorine and/or bromine; x can be 3 to 15; y can be 1 to 1.5; a can be 0.1 to 3; b can be 0.1 to 3; c can be 0 to 2; d can be 0 to 2; e can be 0 to 4 and z is a number necessary to satisfy the valence of all other elements.

14. A method, as set forth in claim 13, wherein the step of flushing is conducted at a temperature of from about 225° C. to about 350° C.

15. A method, as set forth in claim 13, wherein the amount of said oxide of nitrogen introduced into the reactor for the step of flushing equals from about 0.5 to about 50 times the volume of said catalyst.

16. A method, as set forth in claim 13, wherein the step of flushing is conducted for a period of from about one minute to about several hours.

17. A method, as set forth in claim 13, wherein said oxide of nitrogen is selected from the group consisting of all oxides of nitrogen gas and mixtures thereof.

18. A method, as set forth in claim 17, wherein said oxide of nitrogen is nitric oxide.

19. A method, as set forth in claim 13, wherein x is 12; y is 1; a is 1 to 2; b is 0.1 to 1; c is 0 to 0.7; d is 0 to 1 and e is 0 to 1.

20. A method, as set fortth in claim 13, wherein the composition of said phosphomolybdic acid based catalyst contains arsenic.

21. A method, as set forth in claim 13, wherein the coomposition of said phosphomolybdic acid based catalyst contains vanadium.

22. A method, as set forth in claim 13, wherein the composition of said phosphomolybdic acid based catalyst contains copper.

23. A method, as set forth in claim 13, wherein the composition of said phosphomolybdic acid based catalyst contains bismuth.

24. A method, as set forth in claim 13, wherein the composition of said phosphomolybdic acid based catalyst contains an alkali metal.

* * * * *